United States Patent [19]

Huey

[11] 3,727,309
[45] Apr. 17, 1973

[54] DENTURE AND METHOD
[75] Inventor: Elbert P. Huey, Scottsdale, Ariz.
[73] Assignee: Comfo-Dent Corporation of America, Scottsdale, Ariz.
[22] Filed: June 6, 1972
[21] Appl. No.: 259,623

Related U.S. Application Data

[63] Continuation-in-part of Ser. No. 59,922, July 31, 1970, Pat. No. 3,667,123.

[52] U.S. Cl. ............................................................. 32/2
[51] Int. Cl. ....................................................... A61c 13/00
[58] Field of Search ............................................... 32/2

[56] References Cited

UNITED STATES PATENTS

| | | | |
|---|---|---|---|
| 3,667,123 | 6/1972 | Huey | 32/2 |
| 2,778,110 | 1/1957 | Gooris | 32/2 |
| 3,226,826 | 1/1966 | Town | 32/2 |
| 3,241,238 | 3/1966 | Kersten | 32/2 |
| 3,083,459 | 4/1963 | McMurry et al. | 32/2 |

Primary Examiner—Louis G. Mancene
Assistant Examiner—J. Q. Lever
Attorney—Eric P. Schellin et al.

[57] ABSTRACT

A prosthetic denture and method of manufacture comprising a set of artificial teeth which are reinforced at their base portions by a U-shaped frame. The set of artificial teeth are bonded to a fairly rigid continuous thermoplastic or thermoset material. As a second stratum another less rigid thermoplastic or thermoset layer is included. The latter layer is deformable to intimately fit the gum area and/or the palatal area of the mouth. The denture is used by placing it in a person's oral cavity and deflecting the less rigid portion into a set to accurately conform with the edentulus ridge in the cavity. The denture may also have a liner directly in abutment with the gum area and/or the palatal area. The liner may be only partially cured plastic material which may be further cured, preferably in place, or it may be a relatively soft thermoplastic material.

12 Claims, 8 Drawing Figures

3,727,309

DENTURE AND METHOD

BACKGROUND OF THE INVENTION

This application is a continuation-in-part application of Ser. No. 59,922, filed July 31, 1970, now U.S. Pat. No. 3,667,123.

In accordance with the prior art, it has been recognized that prosthetic dentures may be self-fitted by a patient. Various methods for accomplishing this result include the use of thermosetting resinous material which may be used to coat a prosthetic denture before inserting in the mouth for self-fitting and this process has been somewhat unsatisfactory due to the exothermal reaction effects which tend to irritate or burn the mucous membranes in the mouth.

Furthermore, prior art prosthetic dentures used for selffitting purposes have included plate structures which are substantially glass hard and are therefore difficult to reshape and refit in accordance with the progressive changes which occur in the contours and dimensions of oral tissues.

It has been apparent to persons practicing in the dental profession that a patient is not ordinarily capable of handling a hard setting plastic material in the mouth for final fitting of a prosthetic denture and accordingly, prior art attempts to utilize such materials have resulted in injury to the mucous membrane areas of the patient's mouth due to exothermal reactions of the hard setting plastic materials during the final fitting of such materials to the arches and ridges of a patient's oral cavity.

The prior art includes self-fitting dentures and methods wherein a pair of artificial dentures are installed by the patient in his mouth in connection with an alignment plate. However, alignment plates are difficult to handle without substantial experience and therefore most patients are not capable of utilizing an alignment plate in order to properly install the upper and lower prosthetic dentures relative to each other.

While the background provided in the above is primarily concerned with self-fitting dentures, this is not to be taken that the instant invention is to be strictly construed with respect to such devices. Actually, of course, it will be seen that such devices of the present invention may be fitted by experts such as dentists.

SUMMARY OF THE INVENTION

In accordance with one embodiment of the present invention, artificial dentures are constructed by providing artificial teeth with open notch portions disposed in opposed relation to the bite portions of such artificial teeth and a rigid frame member is installed and bonded in the notch portions of the artificial teeth to hold them in a rigid assembled condition. Then the set of teeth so assembled with the frame member are placed in a mold. The remainder of the mold is filled with resin so as to further bond the artificial teeth with a cured fairly rigid thermoset or molded thermoplastic material whereby an artificial denture is produced. When the denture is a maxillary set, it is then coated with an additional layer of less rigid thermoplastic or thermoset material. Both upper and lower dentures may be given yet an additional layer of an uncured resin as a liner and placed in a person's oral cavity and deformed and deflected into closely fitted relationship with an edentulus ridge therein, whereupon the lastmentioned resin coating may be allowed to cure and to thereby attain a very close fitting accurate conformance with the edentulus ridge of the oral cavity. On the other hand the last-mentioned liner may be a thermoplastic material which softens considerably at 140°-150° F. but is much more rigid at mouth temperature.

The artificial denture of the invention in another embodiment contemplates a rigid frame encapsulated in the base portion of the teeth. The less rigid portion is capable of being held in a deflected position and into close conformity with an edentulus ridge in a patient's mouth whereby a final fitting of the artificial denture may be accomplished by utilizing uncured thermosettable material as the mentioned final liner on the artificial denture for final fitting purposes in the patient's mouth or readily softened thermoplastic material.

The invention also comprises the production of a pair of artificial denture plates having a 4 ½ inch curve of spee which obviates the necessity of attempting to utilize an alignment plate which a patient is not ordinarily capable of handling properly. The 4 ½ inch curve of spee will allow the patient accurately to fit a pair of dental plates so that the mandible may be moved in any normal direction without cuspal interference. In a preferred embodiment, teeth with inverted cusps are employed, so as to eliminate any problem of cuspal interference.

The thermosettable material used in accordance with the present invention is not overly exothermal in its curing process and therefore may be used in the mouth with relative comfort in connection with artificial dentures for final fitting or corrective fitting as desired. Additionally, the plastic material, defined as being either thermoplastic or thermoset, utilized in accordance with the invention may allow the patient to self-fit dentures and then trim them and/or refit them from time to time as desired.

The invention comprises a novel combination of a rigid frame or reinforcing element for holding a plurality of artificial teeth in proper disposition relative to each other. The teeth are bonded to a fairly rigid thermoplastic or thermoset material to which is attached a less rigid thermoplastic material which when heated is deformable. Upon cooling, the less rigid material has sufficient set strength to hold the deformed position so that fitting of the artificial denture of the invention to a person's mouth may be accomplished by deforming and deflecting the less rigid structure thereof into close conformity with a great variety of configurations as may be found in various persons' oral cavities and whereby a minimal variety of artificial dentures may be thus manufactured to satisfy the demands of the general public. In connection with the upper denture, the less rigid material is employed as the palatal covering.

Accordingly, it is an object of the present invention to provide a novel prosthetic denture and methods of manufacture.

Another object of the invention is to provide a prosthetic denture having novel deformable structure particularly adapted for possible use in self-fitting of such dentures by a patient.

Another object of the invention is to provide a prosthetic denture having novel deformable structure adapted to fit a great variety of configurations and which may readily be fitted in accordance with a method of the invention by utilizing a thermosettable material which may readily and comfortably be cured in the patient's mouth without damaging the mucous membranes therein.

Another object of the invention is to provide a prosthetic denture as an article of manufacture which has normal structural features including artificial teeth having notched portions in one embodiment in which a rigid frame is bonded and which supports the artificial teeth in such a manner that a readily deformable and resilient soft palate structure may be utilized for deflection fitting to the features of a person's oral cavity. In another embodiment, the rigid frame is a reinforcing element embedded in the base portion of the set of teeth. The teeth may be molded around the reinforcing element.

Another object of the invention is to provide novel methods of manufacture and fitting of a prosthetic denture so that such dentures may be self-fitted very accurately, comfortably and efficiently.

Another object of the invention is to provide a prosthetic denture having a pliable soft final plastic layer, which may be readily deformed, trimmed or added to as desired.

Further objects and advantages may be apparent from the following specification, appended claims and accompanying drawings.

DESCRIPTION OF THE PREFERRED EMBODIMENTS

Figure 1:
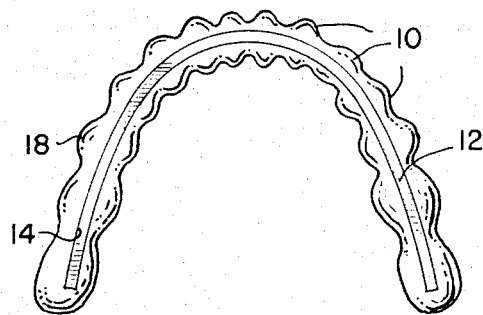
FIG. 1 is a plan view of a rigid, substantially U-shaped frame of the invention set and bonded into open notch portions of a set of artificial teeth.
Figure 4:
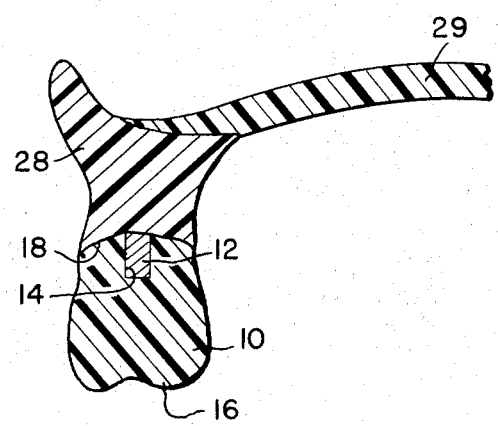
FIG. 4 is a cross-sectional view of a fragmentary portion of another embodiment of the prosthetic device of the present invention.
Figure 5:
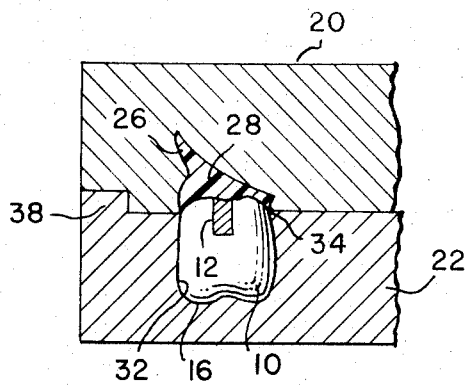
FIG. 5 is a cross-sectional view of a mold showing an artificial denture of the invention therein and as partly produced in accordance with the method of the invention.
Figure 7:
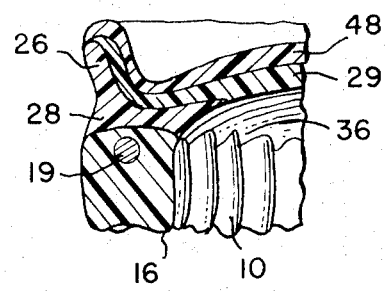
FIG. 7 is an enlarged fragmentary cross-sectional view of a complete maxillary prosthetic denture of the invention after final fitting and in accordance with the final fitting methods of the invention.

As shown in FIG. 1, a mandibulary or maxillary set of artificial teeth 10 are assembled in connection with a substantially U-shaped metal frame 12. This metal frame is generally U-shaped to match the usual edentulus ridge of a patient's mouth. The artificial teeth 10 as shown in FIGS. 4, 5 and 7 are all provided with open notch portions 14 in which the frame 12 is disposed. The artificial teeth 10 are all provided with bite portions 16 adapted for occlusion and are provided with base portions 18 in which the notch portions 14 are disposed. The notch portions 14 are all open at said base portions 18 so as to permit the artificial teeth 10 readily to be installed on the frame 12.

Figure 6:
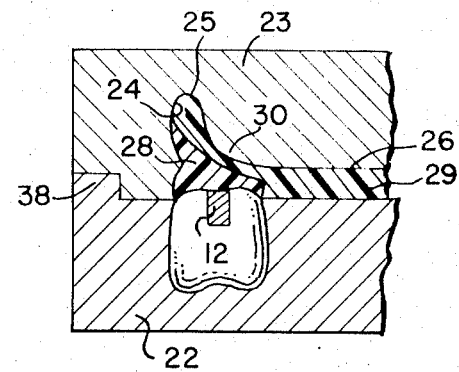
FIG. 6 is a cross-sectional view of a mold showing the artificial denture being subjected to further molding technique.

The frame 12 is preferably made of a high tensile strength material such as hardened alloy steel or the like and as shown in FIGS. 4, 5 and 6, this frame member 12 has a vertical dimension or depth greater than its breadth to provide for cross-sectional rigidity in a substantially vertical direction and the cross section is thus greater in a direction toward the bite and base portions 16 and 18 than it is in a direction laterally thereof.

The teeth 10 shown on the frame 12 in FIG. 1 of the drawings are bonded to the frame 12 by an epoxy or any other suitable cement or bonding agent which will hold the teeth rigidly in connection with the frame 12.

Figure 2:
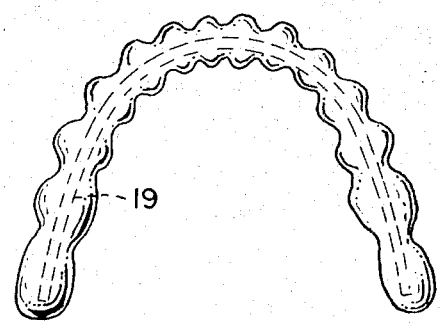
FIG. 2 is a plan view of another embodiment wherein the U-shaped frame constitutes a reinforcing element embedded in the base of each tooth.

In FIG. 2 the artificial teeth are molded in a suitable mold and a reinforcing U-shaped rod element 19 is molded therein (shown by dotted lines) near the base portion of the teeth. Reinforcing element 19 is also constructed of steel. The teeth are cast or molded with an acrylic resin. Other resins are also suitable, provided they have the necessary combination of properties as hardness, stain resistance, impact strength, non-flow (non-creep) and resistance to body fluids and foods. They must also be non-toxic and non-irritating to membranes and have color stability. Applicable are the polyacetal and polycarbonate thermoplastic resins. It is definitely envisaged that other quite hard thermoplastics could be applicable.

In accordance with a method step of the invention, the artificial teeth 10 and the frame 12 are disposed in cavities formed by a pair of mold blocks 20 and 22 as shown in FIG. 5 of the drawings. If thermoset material is used, the material 28 together with a curing agent is introduced into the cavities of the mold blocks 20 and 22 whereupon the plastic material 28 is allowed to cure and to thereby form the first part of the artificial denture. The plastic material may be thermoplastic so that in situ curing need not take place.

In the second step, as shown in FIG. 6, the upper mold block 20 is removed and is substituted with mold block 23 which has a cavity with a deeply recessed portion 24 to provide a skirt 25 as shown in the resultant denture and a concave portion 26 which in connection with the maxillary denture results in a formed palatal portion. In carrying out the second step of the molding process a less rigid plastic material is applied to produce the stratum 29, as shown in FIGS. 3, 4, 6 and 7. The mold block 23 is provided with a ridge portion 30 similar to an edentulus ridge of a patient's mouth.

FIG. 4 shows another embodiment of the invention wherein the maxillary denture, the overlying stratum as shown by reference numeral 29 does not overlie much of the more rigid plastic material 28.

Figure 8:
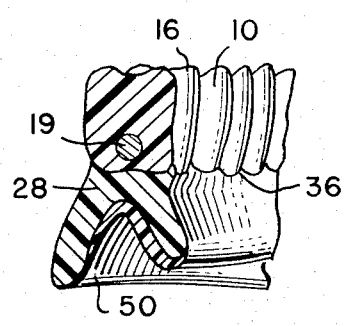
FIG. 8 is an enlarged cross-sectional view of a mandibulary prosthetic denture of the invention after final fitting in accordance with the methods of the invention.

Turning again to the drawings depicting the mold it will be seen that the mold block 22 is provided with cavities 32 into which are positioned the artificial dentures 10 and the block 22 is provided with recess 34 into which the plastic material 28 may flow before it either cures when a thermoset material is used or hardens when a thermoplastic material is employed. These recesses 34 are located between the teeth and are similar to the usual natural gums in shape so as to produce intermediate artificial gum portions 36 as shown in FIGS. 7 and 8. It will be understood that the mold blocks 20 and 22 may be made of disposable material or of metal and are provided with overlapping index ledges 38 as shown in FIG. 5, to insure that the molds are in proper registry when the plastic material 28 is being molded or cured to bond it to the frame 12 and artificial teeth 10 in one embodiment and just to the teeth in another embodiment. The second replacement mold block 23 may also be constructed of a disposable material or metal and is similarly provided with overlapping index ledges 38. The disposable material may be plastic or plaster.

Figure 3:
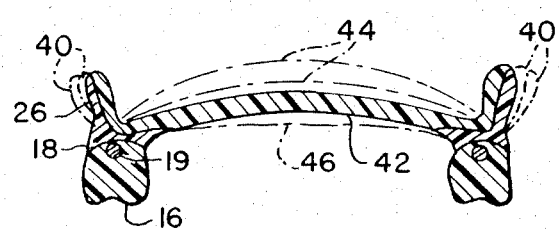
FIG. 3 is a cross-sectional view of a prosthetic denture manufactured in accordance with the present invention.

As shown in FIG. 3, an article of manufacture in accordance with the present invention and method is disclosed. This article of manufacture is an artificial denture as produced in the mold blocks 20 and 22, in a first step and 23 and 22 in the second step as shown in FIGS. 5 and 6 of the drawings. This artificial denture as shown in FIG. 3, is adapted for use in fitting an edentulus ridge in the maxillary area of a patient's mouth and the plastic material 28 is rigid and the overlying plastic stratum 29 is pliable and resilient at a temperature of about 150° F. but capable of being set in a deformed position from that as shown in FIG. 3, so as to hold the resilient, soft plastic material 29 in any desired set position to conform with the edentulus ridge area of a human oral cavity.

As shown in FIG. 3 of the drawings, the skirt portion 26 as described in connection with FIGS. 5 and 6 of the drawings, may be deflected to various set positions as indicated by broken lines 40, and the palate engaging portion 42 of the artificial denture is adapted to be deflected and deformed into close proximity with the palatal vault in the maxillary area of a human oral cavity. It will be seen that this portion 42 may be deflected upwardly into various broken line positions 44 or downwardly into a broken line position 46 depending upon the geometry of the palatal vault of a given patient. When the palate engaging portion 42 is deflected and deformed, while heated to about 150° F., into a set position as indicated by any one of the broken line positions 40, 44, or 46, it is capable of holding the plastic material 29, when it is a thermoplastic material, in a set disposition in close conformity with the geometry of the respective oral cavity.

Accordingly, it will be appreciated that the method step as shown in FIG. 3 by broken lines, comprises the deflection and deforming of layer or stratum 29 so as to conform closely with a maxillary or mandibulary edentulus ridge area of an oral cavity and as shown in FIGS. 7 and 8, additional liners of plastic material are designated 48 and 50, respectively. These layers of plastic material 48 and 50 are placed on the respective maxillary and mandibulary dentures produced in accordance with the molding method as shown in FIGS. 5 and 6 of the drawings, and are then inserted in the oral cavity and deformed into close conformity therewith as shown in FIG. 3 of the drawings. The liners of plastic material 48 and 50 include uncured material and a suitable curing agent and relatively soft thermoplastic material. Accordingly, it will be appreciated that the plastic material forming the liners 48 and 50 very accurately conforms with the features of the maxillary and mandibulary areas when the plastic stratum 29 is deflected into close conformity with the respective areas of the oral cavity. Deformation of the heated stratum 29, when it is a thermoplastic material, may be accomplished by a person's fingers so that the artificial denture of the invention may be self-fitted when the liners of plastic material 48 and 50 are placed on the dentures and the dentures are then located in the oral cavity in their respective positions. The liner material is soft enough at 140°–150° F. to provide an accurate impression of the lining of the oral cavity without displacement of soft tissues. The material is firm (at least 60 Durometer Type A hardness) at body temperature and shows dimensional stability over extended periods of use.

It will be appreciated that the base material of the layer shown by reference numeral 28 in the Figures is fairly rigid. The molding material may be advantageously a thermoplastic high molecular weight ethylene-vinyl acetate resin, high-density polyethylene and isotactic polypropylene. The applicable plastics may be blends or compounds thereof. They should have at room temperature a hardness of Durometer Type A of 75 or higher, preferably greater than 80, and a softening point of the ring and ball type in excess of 212° F. It is also desirable that the resin have some slight flexibility at 100° F. in contrast to being completely rigid in structure. The Durometer hardness test is described in *Encyclopedia of Polymer Science and Technology*, Interscience Publishers, New York, N.Y. (1967), Vol. 7, pages 473–474.

The plastic material advantageously used in the stratum 29, that is, the palatal area of the maxillary denture, must have a capability of being easily deformed and extended, without tearing, by relatively slight finger pressure at a temperature of between about 140°–150° F. or only slightly higher temperatures. At room temperature, the material should have a Durometer, Type A, hardness of 60 or higher, a tensile strength of at least 400 psi and an elongation of at least 700 percent. Advantageously, ethylene-vinyl acetate copolymers are applicable. Other plastics having utility for this purpose are polycaprolactones, polyterpenes and styrene copolymers and blends thereof.

It will be noted that the liners 48 and 50 may be plastic material such as a curable acrylic. The liner material may also be a thermoplastic such as an ethylene-vinyl acetate copolymer or polyvinyl ether, each compounded with suitable plasticizers to produce a material with softening points above 100° F., and Durometer hardness of 70 or lower. These thermoplastic materials may be compounded with materials such as polyterpene resins and waxes such as narrow molecular polyethylene waxes. The liner material should be in the range of between 20,000 to 50,000 poise, at the temperature at which the impression is taken. The liner material must be non-toxic and non-irritating to mucous membranes. When a curable liner material is employed it must have the capability of being cured in the mouth in less than 10 minutes with only relatively mild exothermic reaction.

This soft plastic material readily bonds to a previously cured portion of the plastic stratum 29 as formed in the mold blocks 23 and 22 so that stratum 29 readily receives the liner portions 48 and 50 of the maxillary and mandibulary artificial dentures at a time when the dentures are fitted in the respective areas of the human oral cavity.

The denture as shown in FIGS. 3 and 4 and the corresponding mandibulary denture may be produced in a standard size and the only difference in the standard artificial denture will be the six anterior artificial teeth. Accordingly, the customer or patient purchasing artificial dentures as produced in accordance with the invention, may readily pick from a minimum of sizes, a set which most resembles the teeth that they originally had, namely, the six anterior teeth.

It has been well established that 95 percent of men's and women's molar teeth are 2 inches apart and, accordingly, the U-shaped spread of the frame or reinforcement 12 is substantially 2 inches at the rear area thereof. The frame or reinforcement 12 holds the teeth in solid rigid assembly relative to each other and the base, including the plastic stratum 29, when a thermoplastic, is soft and pliable when warmed and this material can be formed accurately in the oral cavity with the digital finger of the patient so that the artificial dentures of the invention may readily be self-fitted. On the other hand, the material may be a thermoset so that the uncured plastic material 48 and 50 hereinbefore described is applied and installed by the person when self-fitting the dentures of the invention or by a dentist. Vertical dimensions of the artificial dentures of the invention may be readily adjusted by adding or removing portions of the liner material. The artificial denture of the present invention with its liner portions 48 and 50 will be very comfortable to the respective areas of the oral cavity and may be added to or replaced as time goes on since these areas change over the years. The plastic stratum 29 and the liner portions 48 and 50 are capable of being trimmed with scissors and thus alterations for fitting may be made by the patient as desired or by the dentist.

It will be appreciated that the method of the invention for fitting artificial dentures is a continuation or extension of the method for manufacturing the same dentures and therefore the artificial dentures are initially produced by bonding the artificial teeth 10 to the frame 12, in one embodiment, which is subsequently placed in the mold blocks 20 and 22 and plastic material 28 and its respective curing agent, or is molded with a thermoplastic material. This plastic material is then allowed to cure in the mold blocks 20 and 22 whereupon, when the artificial denture is to be used in the maxillary region, it is completed by substituting mold block 23 so a softer thermoplastic stratum 29 may be achieved, in one embodiment. In properly employing the maxillary artificial denture, the denture is heated to between about 140°–150° F. and the palatal section 42 of stratum 29 is shaped to approximate the configuration of a patient's palatal region. After the deformed portion of the maxillary denture has set the liner material is applied. In the case of the mandibulary denture stratum 29 is not employed so that the liner 50 is applied directly to the lower face of stratum 28. In either situation liner 48 or 50 is in close conformity with the respective features of the oral cavity and the method of fitting is complete.

What is claimed is:

1. As a new article of manufacture, a prosthetic denture device comprising, a rigid U-shaped metal frame; artificial teeth rigidly affixed to and held in dentally operative position by said rigid U-shaped metal frame; a rigid base material bonded to the base portions of said artificial teeth; a semi-rigid resilient thermally deformable material bonded to said rigid base material, forming a semi-rigid resilient ridge-engaging portion to be thermally deformed to close conformance with the edentulus ridges and palatal area of a person's mouth, said semi-rigid base material being deformable at a temperature above body temperature but below a temperature which would injure the person's oral tissues, such that when said denture is heated to said deforming temperature and placed within the person's mouth, the semi-rigid resilient material can be readily deformed by finger pressure to cause said semi-rigid material to conform with said edentulus ridges and palatal area and, upon cooling to body temperature, said deformed semi-rigid resilient material holds said denture device in dentally operative position within said person's mouth, with said teeth being rigidly supported by said frame.

2. The article of manufacture of claim 1 wherein a liner of relatively soft plastic material is bonded to semi-rigid resilient thermally deformable material, said liner is positioned to be in direct contact with a portion of a person's oral cavity.

3. The article of manufacture of claim 1 wherein the rigid base material is a synthetic resin selected from the group consisting of high molecular weight ethylene-vinyl acetate copolymers, high density polyethylene and polypropylene, said resin having a Durometer Type A hardness of at least 75, and a softening point in excess of 212° F.

4. The article of manufacture of claim 1 wherein the semirigid resilient thermally deformable material is a synthetic resin selected from the group consisting of ethylene-vinyl acetate copolymers, polycaprolactones, polyterpenes and copolymers of styrene, said resin having a Durometer Type A hardness of about 60, a tensile strength of at least 400 psi and an elongation of at least 700 percent.

5. The article of manufacture of claim 4 wherein the rigid base material is a synthetic resin selected from the group consisting of high molecular weight ethylene-vinyl acetate copolymers, high density polyethylene and polypropylene, said resin having a Durometer Type A hardness of at least 75, and a softening point in excess of 212° F.

6. The article of manufacture of claim 5 wherein a liner of thermoplastic material is bonded on said semi-rigid resilient thermally deformable material.

7. The article of manufacture of claim 6 wherein the liner has a Durometer Type A hardness of about 60 at about 99° F.

8. The article of manufacture of claim 1 wherein the U-shaped metal frame is a reinforcing element completely embedded with the base portion of the artificial teeth.

9. A method for manufacturing a set of prosthetic dentures comprising:
   a. preparing a set of artificial teeth, including rigidly affixing said teeth at the base portion thereof to a generally U-shaped rigid metal frame to hold said teeth fixed and supported in dentally operative position by said rigid frame;

b. placing said frame-teeth assembly in a first mold having a spaced continuous cavity along the base portion of the teeth;
c. then applying a quantity of heated hardenable thermoplastic material to fill said cavity;
d. treating said hardenable thermoplastic material to harden it;
e. placing said frame-teeth assembly having bonded thereto the hardened thermoplastic material in a second mold having a spaced continuous cavity along the said bonded thermoplastic material;
f. thereafter applying a quantity of heated semi-rigid thermoplastic material to fill said cavity;
g. cooling said semi-rigid thermoplastic material to bring it to its normal state;
h. then preheating said semi-rigid thermoplastic material to a deforming temperature higher than body temperature but lower than a temperature which would injure the person's oral tissues;
i. placing the said denture into a person's mouth and deforming said semi-rigid thermoplastic material while at said deforming temperature with finger pressure to closely conform to and engage said edentulus ridges and palatal area of the person's mouth; and
j. cooling said denture to at least body temperature, such that said teeth are positioned within said person's mouth in dentally operative alignment and position, said teeth being rigidly supported and aligned by said frame.

10. The method of claim 9 wherein the artificial teeth are prepared by molding resin material about the generally U-shaped rigid metal frame whereby the said metal member is incorporated within the base portion of the teeth as an encapsulated reinforcing member.

11. The method of claim 9 wherein a step is included between steps (i) and (j) involving bonding a soft plastic material to the outer surface of said semi-rigid thermoplastic material.

12. As a new article of manufacture, a prosthetic denture device comprising, a rigid U-shaped metal frame; artificial teeth rigidly affixed to and held in dentally operative position by said rigid U-shaped metal frame; a rigid base material bonded to the base portions of said artificial teeth; a liner of relatively soft thermoplastic material bonded to the rigid base material, the liner is positioned to be in direct contact with a portion of a person's oral cavity.

* * * * *